(12) United States Patent
Raval et al.

(10) Patent No.: US 12,034,642 B2
(45) Date of Patent: Jul. 9, 2024

(54) DYNAMIC NETWORK SLICING MANAGEMENT IN A MESH NETWORK

(71) Applicant: A5G Networks, Inc., Nashua, NH (US)

(72) Inventors: Kartik Raval, Pune (IN); Kaitki Agarwal, Westford, MA (US); Anupam Goyal, Pune (IN); Ravi Nathwani, Pune (IN)

(73) Assignee: A5G Networks, Inc., Nashua, NH (US)

( * ) Notice: Subject to any disclaimer, the term of this patent is extended or adjusted under 35 U.S.C. 154(b) by 0 days.

(21) Appl. No.: 17/932,425

(22) Filed: Sep. 15, 2022

(65) Prior Publication Data

US 2023/0077501 A1   Mar. 16, 2023

Related U.S. Application Data

(60) Provisional application No. 63/245,172, filed on Sep. 16, 2021.

(51) Int. Cl.
*H04L 47/127* (2022.01)
*H04L 41/16* (2022.01)
*H04L 47/125* (2022.01)

(52) U.S. Cl.
CPC ............ *H04L 47/127* (2013.01); *H04L 41/16* (2013.01); *H04L 47/125* (2013.01)

(58) Field of Classification Search
None
See application file for complete search history.

(56) References Cited

U.S. PATENT DOCUMENTS

| | | | |
|---|---|---|---|
| 11,252,655 B1* | 2/2022 | Gupta | H04L 67/02 |
| 11,553,502 B2* | 1/2023 | Bisaria | H04W 24/08 |
| 2017/0006497 A1* | 1/2017 | Thubert | H04L 47/11 |
| 2020/0195495 A1 | 6/2020 | Parker et al. | |
| 2020/0228602 A1 | 7/2020 | Spoczynski et al. | |
| 2020/0382386 A1* | 12/2020 | Narendra | H04W 4/70 |
| 2021/0168031 A1* | 6/2021 | Stockert | H04L 9/0637 |
| 2021/0368514 A1 | 11/2021 | Xing | |

FOREIGN PATENT DOCUMENTS

WO    WO-2020176535 A1    9/2020

OTHER PUBLICATIONS

Singh, Sushil Kumar, et al., "Machine learning-based network sub-slicing framework in a sustainable 5g environment", Sustainability 12.15, (2020), 6250.

* cited by examiner

*Primary Examiner* — Scott B Christensen
(74) *Attorney, Agent, or Firm* — Schwegman Lundberg & Woessner, P.A.

(57) ABSTRACT

The present disclosure describes solutions for dynamic network slicing including provisions to create, modify, and/or delete network slices in a de-centralized communication network including a plurality of central/regional/edge/far-edge locations across hybrid and multi-cloud environment referred to as edge server or edge location for providing service to the users. Network slicing enables multiple isolated and independent virtual (logical) networks to exist together. A plurality of virtual networks, i.e., slices, may be created using resources of the same physical network infrastructure.

17 Claims, 7 Drawing Sheets

Time t0 :

Time t1 :

DYNAMIC NETWORK SLICING MANAGEMENT IN A MESH NETWORK

CLAIM OF PRIORITY

This application claims the benefit of priority to U.S. Provisional Patent Application Ser. No. 63/245,172, filed on Sep. 16, 2021, and entitled "Machine-Learning Based Network Slicing Management in a Mesh Network of 5G Core Network Server Instances," which is incorporated herein by reference in its entirety.

TECHNOLOGY FIELD

The disclosed subject matter is related generally to methods and systems for dynamic network slicing management for network resource allocation update to one or more network slices based on usage data analysis performed using, for example, machine-learning algorithms.

BACKGROUND

As cloud-based services and user consumption of data grows, operators are looking to save cost and provide scalable solutions that can also serve enterprises (also referred to as private networks). Conventional systems are primarily hosted locally or on a single cloud provider. These conventional systems do not allow seamless enterprise integration with operator networks (also referred to as public networks).

Network slicing allows network operators to allocate and dedicate network resources to a plurality users based on a use-case and agreed upon service level agreement. When the network resources are allocated statistically, the resource allocation may be inefficient if the allocated resources are not used as planned.

SUMMARY

The present disclosure describes a method for dynamic network slice management, the method comprising: collecting, at a first service node, current load conditions; generating load condition prediction based on the collected current load conditions; transmitting information regarding load conditions at the first service node to a second service node; receiving, from the second service node, information regarding load conditions at the second service node; generating a proposal for shared slice management based on received information and load condition prediction; modifying network slice configuration at the first service node based on the proposal.

The present disclosure also describes a system comprising at least one hardware processor; and at least one memory storing instructions that, when executed by the at least one hardware processor cause the at least one hardware processor to perform actions comprising: collecting, at a first service node, current load conditions; generating load condition prediction based on the collected current load conditions; transmitting information regarding load conditions at the first service node to a second service node; receiving, from the second service node, information regarding load conditions at the second service node; generating a proposal for shared slice management based on received information and load condition prediction; modifying network slice configuration at the first service node based on the proposal.

The present disclosure further describes a machine-storage medium embodying instructions that, when executed by a machine, cause the machine to perform actions comprising: collecting, at a first service node, current load conditions; generating load condition prediction based on the collected current load conditions; transmitting information regarding load conditions at the first service node to a second service node; receiving, from the second service node, information regarding load conditions at the second service node; generating a proposal for shared slice management based on received information and load condition prediction; modifying network slice configuration at the first service node based on the proposal.

BRIEF DESCRIPTION OF FIGURES

Various ones of the appended drawings merely illustrate example implementations of the present disclosure and should not be considered as limiting its scope.

DETAILED DESCRIPTION

The present disclosure describes solutions for dynamic network slicing including provisions to create, modify, and/or delete network slices in a de-centralized communication network including a plurality of central/regional/edge/far-edge locations across hybrid and multi-cloud environment referred to as edge server or edge location for providing service to the users according to the agreed upon service level agreements (SLAs) by efficiently managing network resources. Network slicing enables multiple isolated and independent virtual (logical) networks to exist together. In other words, a plurality of virtual networks, i.e., slices, may be created using resources of the same physical network infrastructure.

Figure 1:
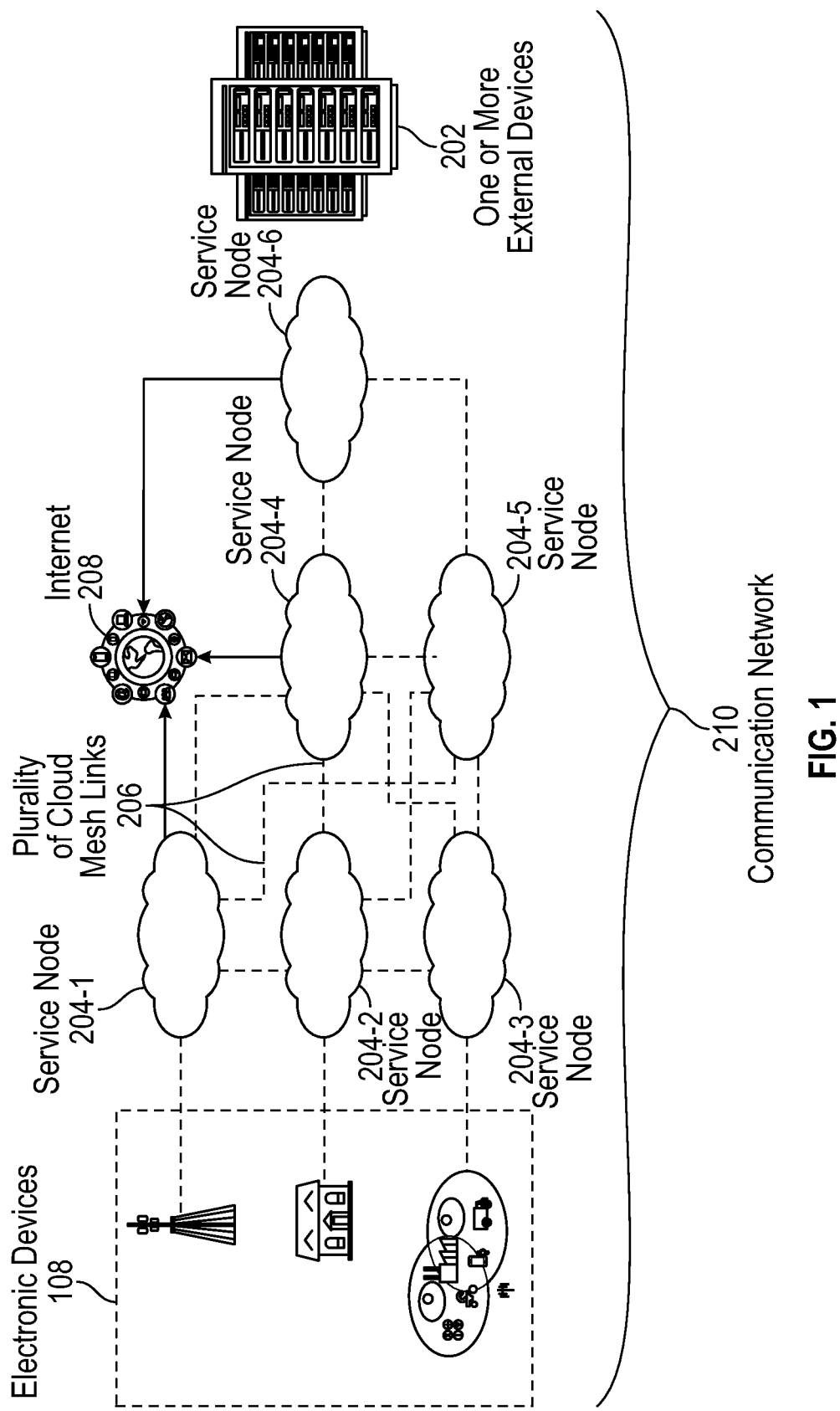
FIG. 1 is a schematic representation of an exemplary cloud system autonomous data and signaling traffic management in a distributed infrastructure, in accordance with some embodiments of the present disclosure.

FIG. 1 is a schematic representation of an exemplary cloud system autonomous data and signaling traffic management in a distributed infrastructure, in accordance with some embodiments of the present disclosure. The cloud infrastructure 200 includes one or more external devices 202 communicatively coupled to a plurality of service nodes 204-1, 204-2, 204-3, 204-4, 204-5 . . . 204-N via a transport network. For the sake of present description, the plurality of service nodes 204-1, 204-2, 204-3, 204-4, 204-5 . . . 204-N have been represented as the plurality of service nodes 204. In some embodiments of the present disclosure, the plurality of service nodes 204 may host a set of network functions including 4G, 5G or Wi-Fi network functions, such as Mobility Management Entity (MME), Signaling Gateway (SGW), Packet Gateway (PGW), Home Subscriber Server (HSS), Policy and Charging Rules Function (PCRF), Evolved Packet Data Gateway (ePDG), Trusted Wireless Access Gateway (TWAG), Centralized Unit (CU), Access & Mobility Management Function (AMF), Session Management Function (SMF), User Plane Function (UPF), Non-3GPP Interworking Function (N3IWF), Network Data Analytics Function (NWDAF), Network Repository Functions (NRF), Network Slicing Selection Function (NSSF), Network Exposure Function (NEF), Unified Data Management (UDM), Authentication Server Function (AUSF), Point Coordination Function (PCF) and the like. In some embodiments, the one or more external devices 202 may include one or more local servers, one or more cloud servers, compute nodes, content data network, internet, the set of network functions, one or more proxy servers and the like. The one or more external devices 202 are configured to host one or more services accessible by the plurality of service nodes 204.

Further, each of the plurality of service nodes 204 may act as a computing system including a plurality of modules to handle various functionality, as described herein. In some embodiments of the present disclosure, the one or more data centers may correspond to private cloud, public cloud, hybrid cloud and the like. Furthermore, the plurality of service nodes 204 are connected with each other via a plurality of cloud mesh links 206. The plurality of cloud mesh links 206 are secured ad hoc routing connections, such as Open Shortest Path First (OSPF) and the like between the plurality of service nodes 204. In some embodiments of the present disclosure, the plurality of service nodes 204 may include multiple physical parameters characterizing the plurality of service nodes 204 and compute one or more system parameters, such as energy requirement, power utilization, processing type, processing power, configuration and the like. Further, each of the plurality of service nodes 204 may have their own state information and characteristics, such as delay, jitter, packet flow information, protocol parameter information, quality of experience and the like, known as one or more network function parameters. In some embodiments of the present disclosure, one or more external inputs or parameters are received by a computing system via internet 208. Furthermore, the one or more system parameters, the one or more network function parameters and the one or more external inputs or parameters are one or more computing system parameters.

In some embodiments of the present disclosure, the service node 204-1, the service node 204-2 and the service node 204-3 are far edge clouds at first level of hierarchy within the cloud infrastructure 200. The first level of hierarchy corresponds to a first proximal distance from the one or more electronic devices 108. Further, the service node 204-4 and the service node 204-5 are regional edge clouds at second level of hierarchy within the cloud infrastructure 200. In some embodiments of the present disclosure, the second level of hierarchy corresponds to a second proximal distance from the one or more electronic devices 108. In some embodiments of the present disclosure, the service node 204-6 is closer to the one or more external devices 202. The service node 204-6 is at third level of hierarchy within the cloud infrastructure 200. In some embodiments of the present disclosure, the third level of hierarchy corresponds to a third proximal distance from the one or more electronic devices 108. In some embodiments of the present disclosure, the one or more external devices 202 may be main data center. In some embodiments of the present disclosure, each of the plurality of service nodes 204 is connected to the internet 208, as shown in FIG. 1.

Further, the cloud infrastructure 200 includes one or more orchestrator nodes connected to the plurality of service nodes 204 via a set of cloud mesh links. In some embodiments of the present disclosure, each of the one or more orchestrator nodes is an instance of a collective group of network functions hosted on the one or more data centers.

Furthermore, the cloud infrastructure 200 includes one or more electronic devices 108 associated with an organization connected to a communication network 210 via a communication channel. In some embodiments of the present disclosure, the communication network 210 may be private network, public network, smart city network, connected car network, Fixed Wireless Access (FWA) and the like. In some embodiments of the present disclosure, the one or more electronic devices 108 are connected to the plurality of service nodes 204. The one or more electronic devices 108 may be used by one or more users associated with the organization to access the communication network 210 for accessing one or more services hosted on the internet 208. In some embodiments of the present disclosure, the one or more external devices 202 are located nearby to the organization. In some embodiments of the present disclosure, the one or more electronic devices 108 may include a laptop computer, desktop computer, tablet computer, smartphone, wearable device, smart watch and the like. In some embodiments of the present disclosure, the one or more electronic devices 108 may also include a microprocessor, a server and the like. Further, the one or more electronic devices 108 include a local browser, a mobile application or a combination thereof. The one or more users may use a web application via the local browser, the mobile application or a combination thereof to communicate with the computing system. In some embodiments of the present disclosure, the one or more electronic devices 108 may access the computing system via a radio access network.

In some embodiments of the present disclosure, the computing system receives a request from the one or more electronic devices 108 within the communication network 210 to access the one or more services hosted on the one or more external devices 202 or a set of services hosted on the internet 208. Further, the computing system determines one or more network parameters based on the received request, one or more device parameters and the one or more computing system parameters by using a trained traffic management based Machine Learning (ML) model. The computing system also determines current network demand within the cloud infrastructure 200 based on the received request by using the trained traffic management based ML model. The computing system determines one or more service nodes at multiple levels of hierarchy within the cloud infrastructure 200 from the plurality of service nodes 204 based on the determined one or more network parameters and the determined current network demand by using the trained traffic management based ML model. In an embodiment of the present disclosure, the one or more service nodes at first level of hierarchy within the cloud infrastructure 200 are service node 204-1, service node 204-2 and service node 204-3, service node 204-4, service node 204-5 and service node 204-6. Furthermore, the computing system dynamically establishes one or more cloud mesh links between the determined one or more service nodes 204-1, 204-2, 204-3, 204-4, 204-5 and 204-6 at the multiple levels of hierarchy and the one or more external devices 202 based on the determined one or more network parameters and the current network demand by using the trained traffic management based ML model. The multiple levels of hierarchy comprises first level, second level, third level of hierarchy and the like. The computing system processes the received request by providing access of the one or more services hosted on the one or more external devices 202 to the one or more electronic devices 108 via the established one or more cloud mesh links.

Figure 2:
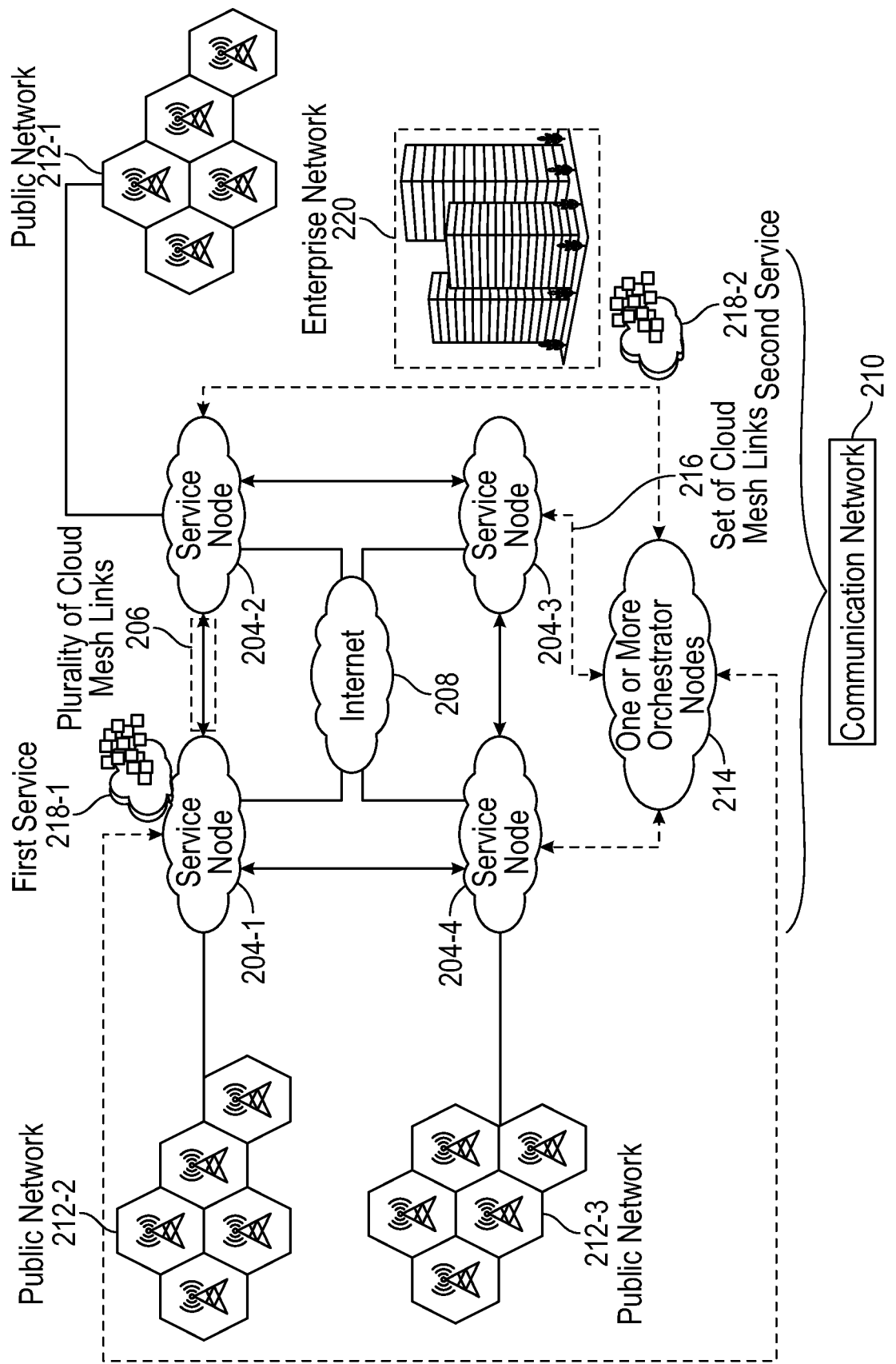
FIG. 2 is a schematic representation of a cloud infrastructure 200 for autonomous data and signaling traffic management in a distributed infrastructure, in accordance with some embodiments of the present disclosure.

FIG. 2 is a schematic representation of a cloud infrastructure 200 for autonomous data and signaling traffic management in a distributed infrastructure, in accordance with some embodiments of the present disclosure. The cloud infrastructure 200 includes the plurality of service nodes 204-1, 204-2, 204-3 and 204-4. For the sake of present description, the plurality of service nodes 204-1, 204-2, 204-3 and 204-4 have been represented as the plurality of service nodes 204. The service node 204-3 is an enterprise cloud associated with the organization. Further, the service node 204-4 is a far edge cloud located at a distant position from the organization. The cloud infrastructure 200 includes the one or more electronic devices 108 associated with the organization connected to the communication network 210 via the communication channel. In some embodiments of the present disclosure, the communication network 210 is a 4G, 5G, 6G and WiFi network with the set of network functions including multiple 4G, 5G, 6G and WiFi network functions running on variety of cloud and compute infrastructures. Furthermore, the cloud infrastructure 200 includes a first public network 212-1, a second public network 212-2 and a third public network 212-3 to communicatively couple the one or more external devices 202 to the plurality of service nodes 204. In some embodiments of the present disclosure, the second public network 212-2 is shorter public network. The plurality of service nodes 204 are connected with each other via the plurality of cloud mesh links 206 and the internet 208. Further, the one or more orchestrator nodes 214 are connected to the plurality of service nodes 204 via a set of cloud mesh links 216. The one or more external devices 202 host a first service 218-1 and a second service 218-2 accessible by the plurality of service nodes 204. In some embodiments of the present disclosure, the plurality of service nodes 204 may also be communicatively coupled with one or more operator networks to achieve seamless integration of the one or more electronic devices 108 with the one or more operator networks.

In some embodiments of the present disclosure, the computing environment 200 is applicable in telecommunication, healthcare, manufacturing, transport, public safety domains and the like. As described above, the computing environment 200 includes the plurality of service nodes 204-1, 204-2, 204-2 and 204-4. For the sake of present description, the plurality of service nodes 204-1, 204-2, 204-3 and 204-4 have been represented as the plurality of service nodes 204. The service node 204-3 is an enterprise cloud associated with the organization. Further, the service node 204-4 is a far edge cloud located at a distant position from the organization. The computing environment 200 includes one or more electronic devices 108 associated with the organization connected to the enterprise network 220 via the private communication channel. In some embodiments of the present disclosure, the enterprise network is a 4G or 5G or 6G or WiFi network and the like. Furthermore, the computing environment includes a first public network 206-1, a second public network 206-2 and a third public network 206-3 to communicatively couple the one or more external devices 202 to the plurality of service nodes 204. In some embodiments of the present disclosure, the second public network 206-2 is shorter public network. The plurality of service nodes 204 are connected with each other via the network 212 and internet 224. Further, the one or more orchestrator nodes 214 are connected to the plurality of service nodes 204 via the network 212. In some embodiments of the present disclosure, the network 212 may be the one or more cloud mesh links. The one or more external devices 202 host a first public network application 226-1 and a second public network application 226-2 accessible by the plurality of service nodes 204.

Figure 3:
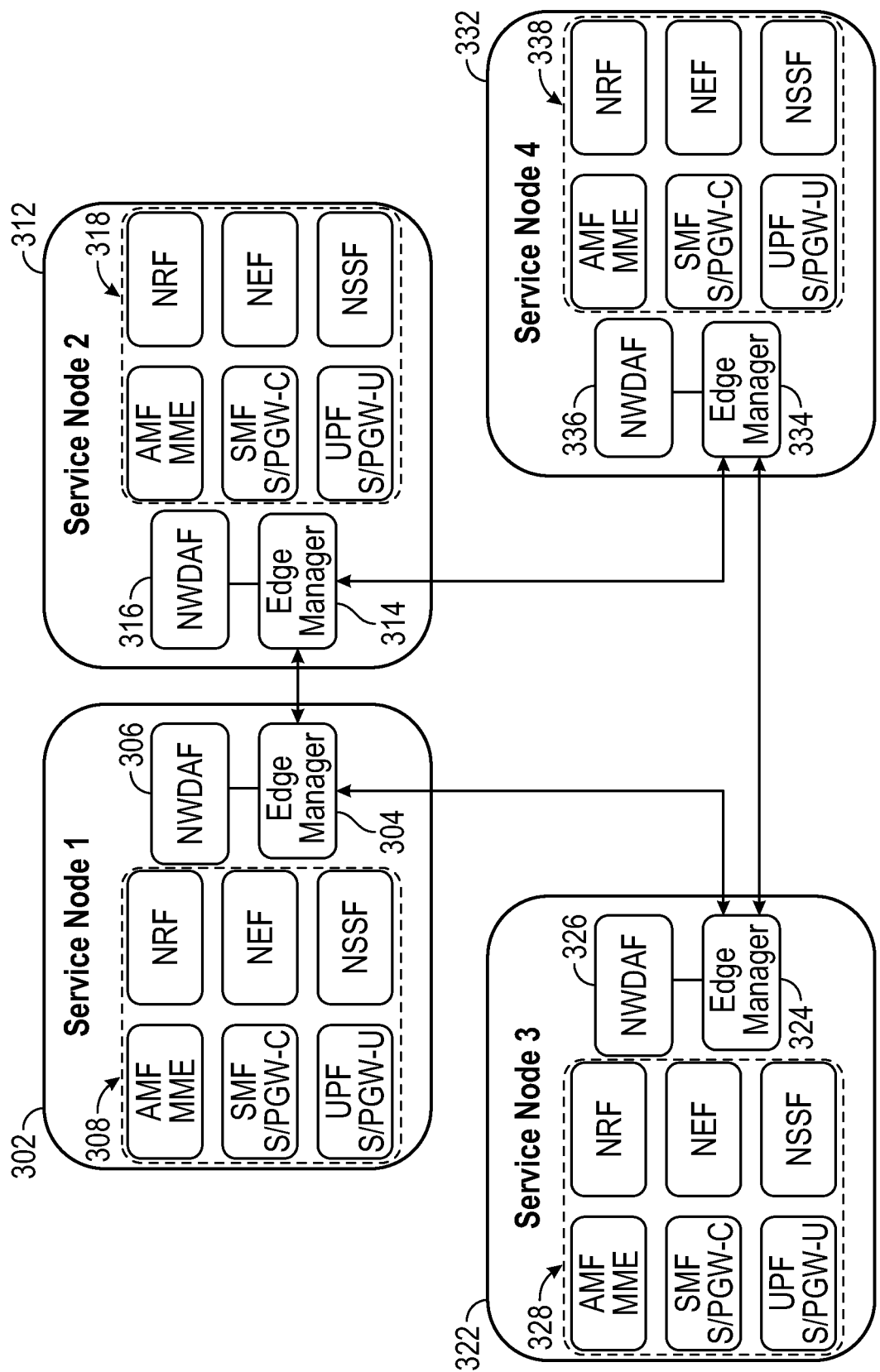
FIG. 3 is a schematic view of service nodes with dynamic network slice management, in accordance with some embodiments of the present disclosure.

FIG. 3 is a schematic view of service nodes with dynamic network slice management, in accordance with some embodiments of the present disclosure. In FIG. 3, four service nodes 302, 312, 322, 332 are shown for illustration purposes only; other number of service nodes may be provided. The service nodes 302, 312, 322, 332 may be provided as public or private (enterprise) networks or a combination thereof, as described in further detail below.

Service node 302 may include an edge manager 304, a network data analytics function (NWDAF) 306, and shared slice components 308. The shared slice components 308 may include any network function including 4G, 5G or Wi-Fi network functions, such as Access & Mobility Management Function (AMF), Mobility Management Entity (MME), Signaling Gateway (SGW), Packet Gateway (PGW), Home Subscriber Server (HSS), Policy and Charging Rules Function (PCRF), Evolved Packet Data Gateway (ePDG), Trusted Wireless Access Gateway (TWAG), Centralized Unit (CU), Session Management Function (SMF), User Plane Function (UPF), Non-3GPP Interworking Function (N3IWF, Network Repository Functions (NRF), Network Slicing Selection Function (NSSF), Network Exposure Function (NEF), Unified Data Management (UDM), Authentication Server Function (AUSF), Point Coordination Function (PCF) and the like.

The edge manager 304 may facilitate interactions with other service nodes and networks, such as private networks and other public networks. The edge manager 304 may communicate with other service nodes (and their respective edge managers) using a communication interface, such as a Cloud Mesh link. The communication interface may be based on webservices, for example, REST based webservices. Edge managers may act as routing agents. In some embodiments, edge managers may take the role of one or more network functions such as S1 proxy, NgAP proxy, Mobility Management Entity (MME), Signaling Gateway (SGW), Packet Gateway (PGW), Access & Mobility Management Function (AMF), Session Management Function (SMF), User Plane Function (UPF), Non-3GPP Interworking Function (N3IWF), Network Repository Functions (NRF), Network Slicing Selection Function (NSSF), Network Exposure Function (NEF) and the like.

Service node 312 may include an edge manager 314, a NWDAF 316, and shared slice components 318. The shared slice components 318 may include any network function including 4G, 5G or Wi-Fi network functions, such as AMF, MME, SGW, PGW, HSS, PCRF, ePDG, TWAG, CU, SMF, UPF, N3IWF, NRF), NSSF, NEF, UDM, AUSF, PCF and the like.

Service node 322 may include an edge manager 324, a NWDAF 326, and shared slice components 328. The shared slice components 328 may include any network function or combination of these functions including 4G, 5G or Wi-Fi network functions, such as AMF, MME, SGW, PGW, HSS, PCRF, ePDG, TWAG, CU, SMF, UPF, N3IWF, NRF), NSSF, NEF, UDM, AUSF, PCF and the like.

Service node 332 may include an edge manager 334, a NWDAF 336, and shared slice components 338. The shared slice components 338 may include any network function or combination of these functions including 4G, 5G or Wi-Fi network functions, such as AMF, MME, SGW, PGW, HSS, PCRF, ePDG, TWAG, CU, SMF, UPF, N3IWF, NRF), NSSF, NEF, UDM, AUSF, PCF and the like.

The NWDAFs 306, 316, 326, 336 may collect usage data for their respective service nodes, analyze the usage data for network slices, and generate predicted usage information regarding resources, as described in further detail herein. The NWDAFs 306, 316, 326, 336 may execute machine-learning algorithms, as described herein. The NWDAFs 306, 316, 326, 336 may continuously analyze the parameters of each network slice and predict the usage or congestion that may occur at a future time. The prediction results as well as other data may be exchanged via a cloud mesh link with other service nodes.

Service nodes 302, 312, 322, 332 may be provided as public and/or private networks or a combination thereof. For example, as explained in detail below, a service node (e.g., service node 302) may be provided as a public network but may provide network slices for a private network in accordance with the dynamic network slice management techniques described herein. Likewise, for example, a service node (e.g., service node 312) may be provided as a private network but may provide network slices for a public network in accordance with the dynamic network slicing techniques described herein.

Network slice management performed by service nodes 302, 312, 322, 332 enables multiple isolated and independent virtual (logical) networks to exist together. In other words, a plurality of virtual networks, i.e., slices, may be created using resources of the same physical network infrastructure. A slice includes shared network components that provides end-to-end connection enabling multiplexing of virtualized and independent logical networks using logical separation. In some embodiments, each network slice may be based on a set of parameters that are part of the SLA of the slice. For example, the set of parameters may include minimum guaranteed bandwidth, maximum end-to-end latency for data packets, guaranteed quality-of-service (QoS), simultaneous maximum number of users, and so on.

The network slice management, as described herein, may monitor one or more key performance indicators (KPIs) of the network slice and allocate and/or update the resources to meet the SLA. For example, the KPIs may be monitored continuously or at a periodic time interval. The periodic time interval may be configurable and/or user specified.

With the advent of 5G, edge networking has gained significance. Accordingly, in some embodiments, service nodes may be provided near the radio access network (RAN), and, therefore, breaking out the customer traffic in the radio network. This may result in achieving better performance experience to the user while at the same time distributing the network processing load amongst a plurality service nodes. Each service node's location can be known as an edge location. For different industry verticals and deployment scenarios there can be different edge types. At high level, this can be referred to as far edge, edge, and regional edge. More specifically, they can be further categorized as telco edge, device edge, critical communication edge, enterprise edge or industrial edge and the likes. Service nodes may be provided at any of these edge locations.

Service nodes 302, 312, 322, 332 may be provided in the same or different edge locations. In some embodiments, a network slice may be managed at each edge location. Resources available at each edge location may be limited, and, therefore, these edge locations may not have endless resources to statically provision each slice and provide the guaranteed SLA.

In some embodiments, machine-learning algorithms may be used for dynamic network slicing management in a mesh network of service nodes located at one or more edge locations. For example, the edge locations may be at different geographic locations, though service nodes may be connected in a mesh network or other suitable types of network configuration.

In some embodiments, a service node (service nodes 302, 312, 322, 332) may send and/or receive configuration information of each edge location, information about one or more network slices at each edge location, one or more KPIs of each network slice, available resources at each edge location, current load, for example, available bandwidth at each edge location, etc. For example, KPIs of a network slice may include capacity, qualification, SLA, network health monitoring, resource allocation, etc.

In some embodiments, resources for one or more network slices may be allocated based on usage analysis for one or more network slices using a machine-learning algorithm executed by a NWADF at each edge location (e.g., NWADFs 306, 316, 326, 336). Based on the usage data of network resources allocated to one or more network slices, the NWADF may determine how the network resources for one or more network slices may be updated to meet the SLA for one or more network slices. For example, the usage data of network resources may be collected based on continuous or periodic monitoring of the network resource usage. The periodic monitoring may be configurable and/or user provided. Based on the analysis of the usage data, the NWADF may predict resources required for one or more network slices to meet the SLA for the one or more network slices.

In some embodiments, the machine-learning algorithm executed by NWADF used for predicting resources required for the one or more network slices may include linear regression algorithm, decision tree algorithm, time series analysis, K-means clustering, etc. In some embodiments, neural network-based machine-learning algorithm, such as artificial neural network (ANN) and/or recurrent neural network (RNN), etc., may also be used for predicting resources required for the one or more network slices.

Figure 4:
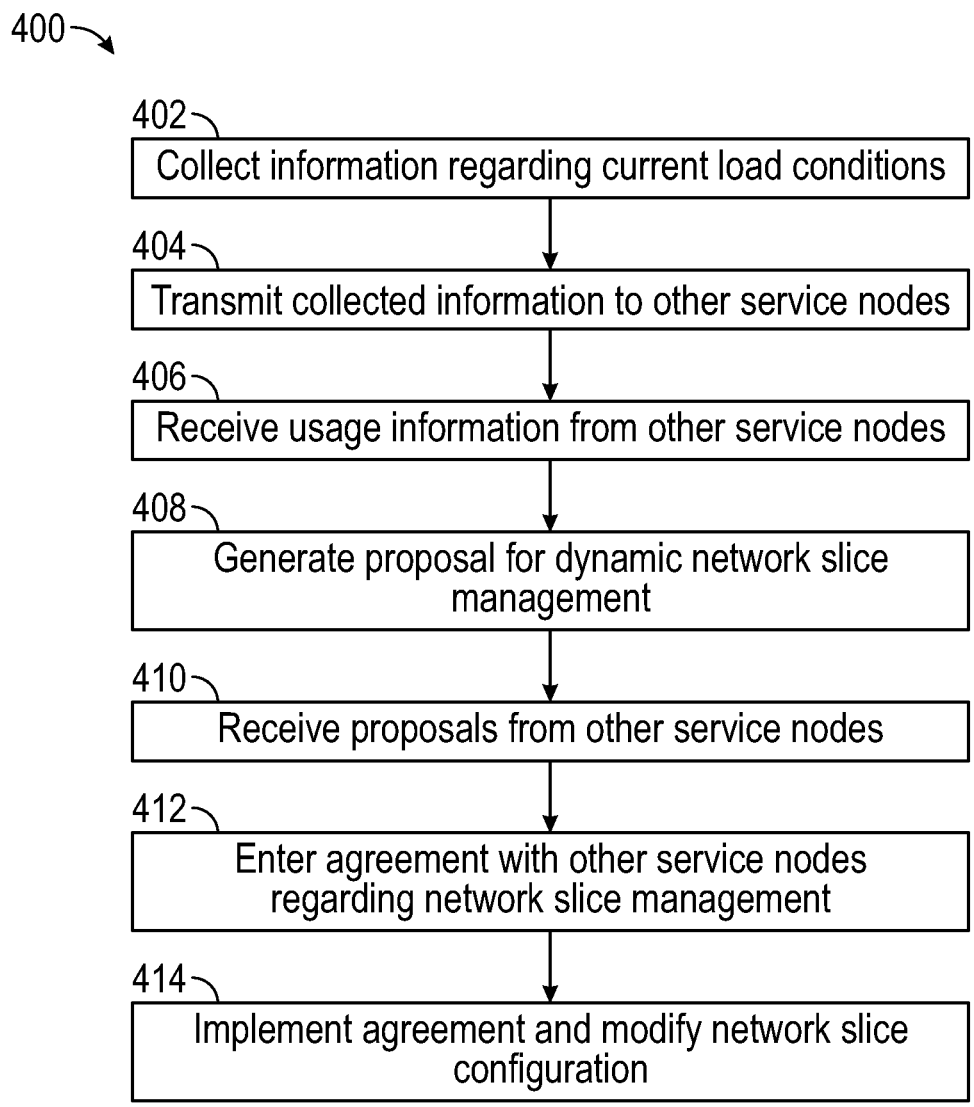
FIG. 4 illustrates a flow diagram for a method for dynamic network slicing, in accordance with some embodiments of the present disclosure.

FIG. 4 illustrates a flow diagram for a method 400 for dynamic network slicing, in accordance with some embodiments of the present disclosure. The method 400 may be executed by one or more service nodes (e.g., service nodes 302, 312, 322, 332). At operation 402, a service node may collect information relating to its current load and conditions, as described herein. For example, the service node may collect information regarding its current load, current network slices running on the service node, current load on each individual slice, KPIs of each slice, configuration of the slices, available resources, available bandwidth, predicted usage, etc. KPIs of a network slice may include capacity, qualification, SLA, network health monitoring, resource allocation, etc. In some examples, a usage prediction may be calculated and included in the collected information.

At operation 404, the service node may transmit at least a portion of the collected information to other service nodes. For example, an edge manager within the service node may transmit the information via a mesh network connecting the service nodes. The transmitted information may include resource availability in terms of compute and storage and aggregated throughput, node congestion status, traffic pattern, subscriber connection pattern, cloud/infrastructure status, policies, ML based recommendation for current utilization and ability to share resources with other nodes.

At operation 406, the service node may receive information from other service nodes regarding the usage conditions of those service nodes. The received information may include resource availability in terms of compute and storage and aggregated throughput, node congestion status, traffic pattern, subscriber connection pattern, cloud/infrastructure status, policies, ML based recommendation for current utilization and ability to share resources with other nodes.

At operation 408, the service node may generate a proposal for dynamic network slice management with the other service nodes. The proposal may be generated using machine-learning algorithms executed by a NWADF and the like in the service node, as described herein. The proposal may define the network slicing arrangement to be followed at future time (e.g., time t1) by self and peer service nodes (e.g., service nodes with which the proposal is being exchanged). Each of the other service nodes may also generate respective network slicing proposals. At operation 410, the service node may transmit its proposal to the other service nodes and receive proposals from the other service nodes.

At operation 412, the service nodes may come to an agreement on network slicing configurations across the service nodes based on the shared proposals. At operation 414, the service node may implement the agreement and modify its network slice configuration accordingly. Other service nodes may also implement the agreement and modify their network slice configurations accordingly.

Figure 5:
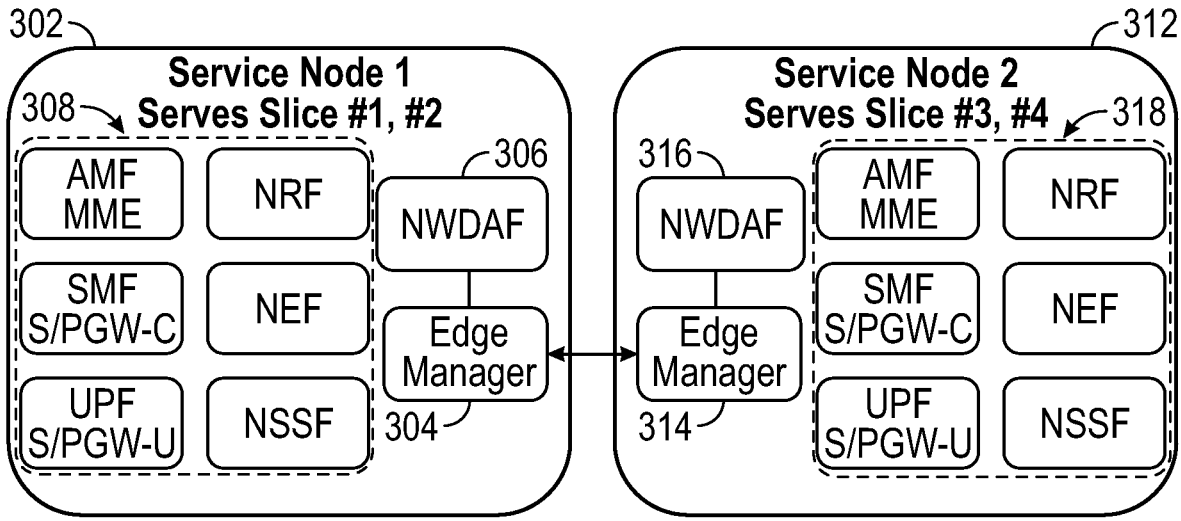
FIG. 5 illustrates an example of dynamic network resource allocation for network slicing, in accordance with some embodiments of the present disclosure.
Figure 5:
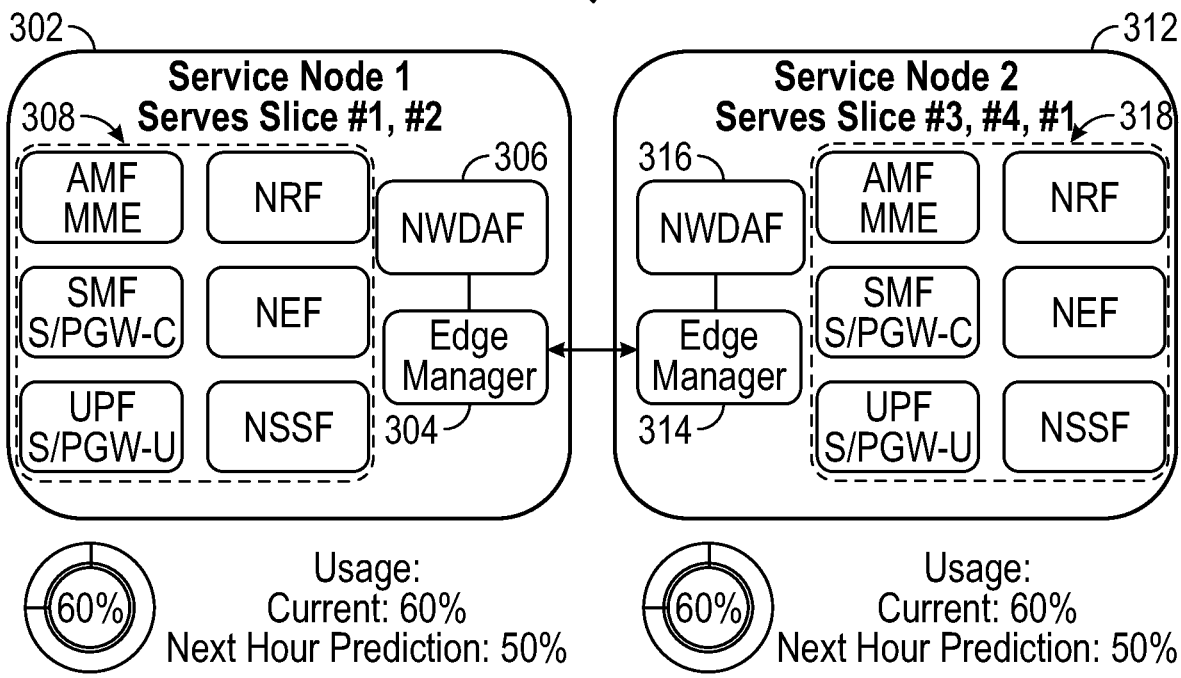

FIG. 5 illustrates an example of dynamic network resource allocation for network slicing, in accordance with some embodiments of the present disclosure. Two service nodes 302, 312 are shown for illustration purposes and more than two service nodes may be provided. At time t0, service node 302 may be servicing slices #1 and #2, and service node 312 may be serving slices #3 and #4. Also, at time t0, service node 302 may calculate its current usage at 75% and its next hour prediction for usage at 80%, based on the techniques described herein. Likewise, service node 312 may calculate its current usage at 35% and its next hour prediction for usage at 45%.

The service nodes 302, 312 may exchange usage information, generate respective proposals, and come to an agreement regarding network slicing for time t1, as described herein (e.g., operations described in method 400, method 600, etc.). The agreement may include a provision that slice #1 will be shared by service nodes 302, 312 starting at time t1 for the next hour instead of being serviced by service node 302 alone. Thus, loads for slice #1 may be divided across the two service nodes 302, 312. The network slicing reconfiguration at time t1 leads to a more balanced load at the service nodes 302, 312. At time t1, service node 302 may calculate its current usage at 60% now as compared to 75% at time t0 and its predicted usage at 50% as compared to 80% at time t0. Likewise at time t1, service 312 may calculate its current usage at 60% as compared to 35% at time t0 and its predicted usage at 50% as compared to 45% at time t0.

Figure 6:
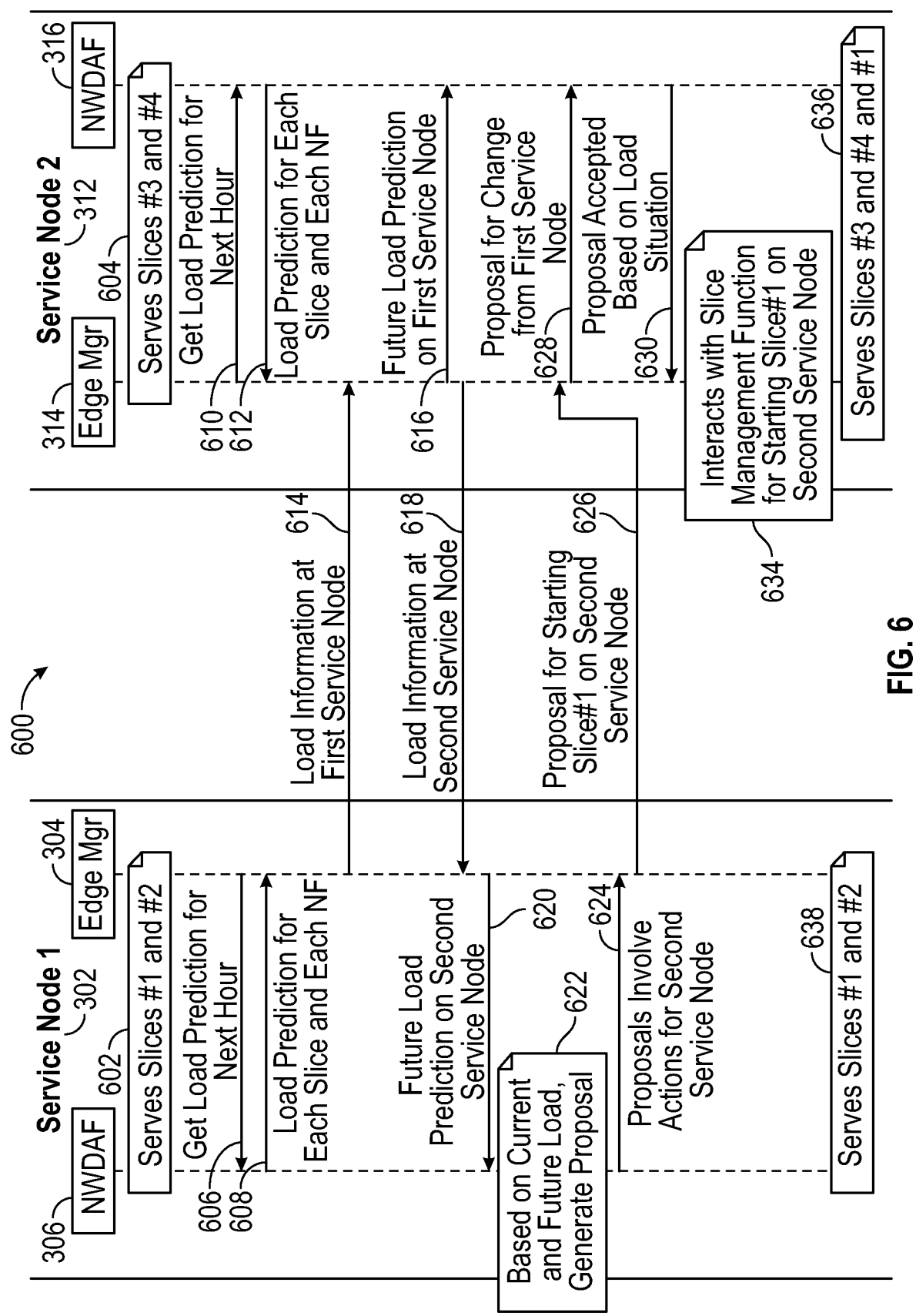
FIG. 6 illustrates a sequence diagram for a method for dynamic network slice management, in accordance with some embodiments of the present disclosure.

Different techniques for generating proposals and agreements can be used. FIG. 6 illustrates a sequence diagram for a method 600 for dynamic network slice management, in accordance with some embodiments of the present disclosure. As shown, the method 600 may be executed by at least two service nodes (e.g., first service node 302 and second service node 312) and in particular the edge managers 304, 314 and NWDAFs 306, 316 residing within those service nodes. At operations 602 and 604, the first service node 302 may be serving slices #1 and #2, and the second service node 312 may be serving slices #3 and #4, respectively.

At operation 606, the edge manager 304 may transmit an instruction to NWDAF 306 to generate load prediction for the next hour or some other specified time interval. At operation 608, NWDAF 306 may generate load prediction at the first service node 302 for each slice and each network function. Likewise, at operation 610, the edge manager 314 may transmit an instruction to NWDAF 316 to generate load prediction for the next hour or some other specified time interval. At operation 612, NWDAF 316 may generate load prediction at the second service node 312 for each slice and each network function.

At operation 614, edge manager 304 in the first service node 302 may transmit load information to the edge manager 314 in the second service node 312. The load information may include network functions, current load, current resources, and further load on each slice and network function at the first service node 302. At operation 616, the edge manager 314 may forward the received load information, in particular the load prediction of service node 302, to the NWDAF 316. Likewise, at operation 618, edge manager 344 in the second service node 312 may transmit load information to the edge manager 304 in the first service node 302. The load information may include network functions, current load, current resources, and further load on each slice and network function at the second service 312. At operation 620, the edge manager 304 may forward the received load information, in particular the load prediction of service node 312, to the NWDAF 306.

At operation 622, NWDAF 306 may generate a proposal based on the load information at the two service nodes. For example, the proposal may include a provision to start service of slice #1 on the second service node 312 for better load division based on current and future load information. At operation 624, the NWDAF 306 may forward the proposal involving service node 312 to edge manager 304. At operation 626, edge manager 304 may transmit the proposal for starting service of slice #1 on the second service node 312 to edge manger 314. At operation 628, edge manager 314 may forward the proposal from the first service node 302 to NWDAF 316. At operation 630, the proposal may be accepted based on load situation by the second service node 312 and this acceptance may be forwarded to its edge manager 314. At operation 634, edge manager 314 may interact with slice management function for starting service of slice #1 on the second service node 312. At operation 636, the second service node 312 may continue serving slices #3 and #4, as well as start serving slice #1. At operation 638, the first service node 302 may continue serving slices #1 and #2, with the load for slice #1 being shared with the second service node 312.

The load division and network slice reconfiguration may be based on slice characteristics. Slices may have privacy, mobility, throughput, etc., characteristics defined in their SLA, and network slicing may be performed in accordance with those characteristics. In some examples, each service node 312, 314 may be coupled to its own respective RAN for serving a shared slice (e.g., slice #1). Hence, the RAN for each service node may distribute the load for slice #1 to each service node accordingly. Each service node may then provide other network components for the slice based on the SLA requirements.

In some examples, a RAN may be shared by the service nodes 302, 312. For example, the RAN coupled to service node 302 may provide all RAN services for slice #1. Hence, the AMF/MME component, which couples to the RAN, for slice #1 may be provided by only service node 302. The edge manager 304 in service node 302 may then divert some traffic for slice #1 to service node 312 for further processing and effectuating load balancing. For example, service node 312 may prove network components such as SMF, UPF, NRF, NEF, NSSF, MME, SGW, PGW and the like for slice #1 while sharing the AMF/MME component in service node 302 for serving slice #1. The AMF/MME component in service node 302 may provide registration functionality for all slice #1 users. The SMF components may provide session management functionality. The UPF components may provide data connection functionality by providing connection of the data from the RAN component to the data network.

In some examples, the SLA for a slice may require a minimum throughput. The UPF component is largely responsible for throughput. Therefore, if a slice with a minimum throughput requirement is being served by different service nodes, each service node may provide a dedicated UPC component to guarantee the minimum throughput requirement and other network components could be shared with other slices.

The dynamic network slicing management as described herein may be used in different scenarios. For example, network slices for a private enterprise may not be heavily loaded at nighttime. Accordingly, the resources for the network slice of the private enterprise may be assigned to other network slice(s) at the same and/or other edge locations. In yet another example, network slice to user equipment (UE) endpoints, such as vehicles, may not be required to be in use all the time. The network slice to such UE endpoints may only be required while the vehicle is in motion. Based on the vehicle's trajectory determined based on analysis of the vehicle's traveling history, resources for the network slice to the vehicle may be updated and/or reallocated. In some cases, different network slice may be allocated to the UE endpoint. In other words, based on the presence of a vehicle in or near an edge location, the required network slice may be provisioned in nearby areas and the network slice may be switched off or pushed to low resource usage once vehicle has moved out of coverage of the edge location.

In some embodiments, based on the usage predictions as described above, service nodes (e.g., edge managers within the service nodes) may adjust the resource provisions for each network slice. For example, the edge manager may start and/or stop the network slice dynamically. Accordingly, SLA for each network slice may be met by resource reallocation.

The various embodiments described herein may enable each edge location to meet the network slice SLA KPIs when there is problem in the network. For example, the problem in the network may be due to increased congestion, a network device failure in the core network and/or RAN, etc. The network slice may then be moved to a nearby edge location via exchange through the cloud mesh link described above.

In some embodiments, the UE endpoint may be configured to select a particular network slice for one or more services used by the UE endpoint. For example, the UE endpoint may also be configured to connect to a particular edge location, identified by a tracking area identifier or other type of identifier.

Data slice management, as described herein, can be used for dedicated and shared slice components. For example, a service node may be hosting slices dedicated to a given enterprise which may only require the slices in certain pre-defined locations (and hence configured on a set of pre-defined service nodes). These dedicated slices may have different set of network components, e.g., for enterprise-1 dedicated slice, the service node may be hosting control plane components (AMF, SMF, UDM, AUSF, PCF) while UPF is hosted on the enterprise premise itself. For enterprise-2 dedicated slice, the service node may be hosting all the components of network (control plane as well as data plane).

A service node may also be hosting slices for a mobile network operator (MNO). Such slices can be shared by a set of users which take up the services of MNO. Since the service can be provided in a local independent manner, MNO can make this slice available at multiple edge locations or multiple service nodes for better service experience.

The data slice management techniques described herein may also allow transparent and appropriate billing to customers based on the actual network slice usage. Accordingly, commercial deployments of enterprise specific network slicing may be provided.

Figure 7:
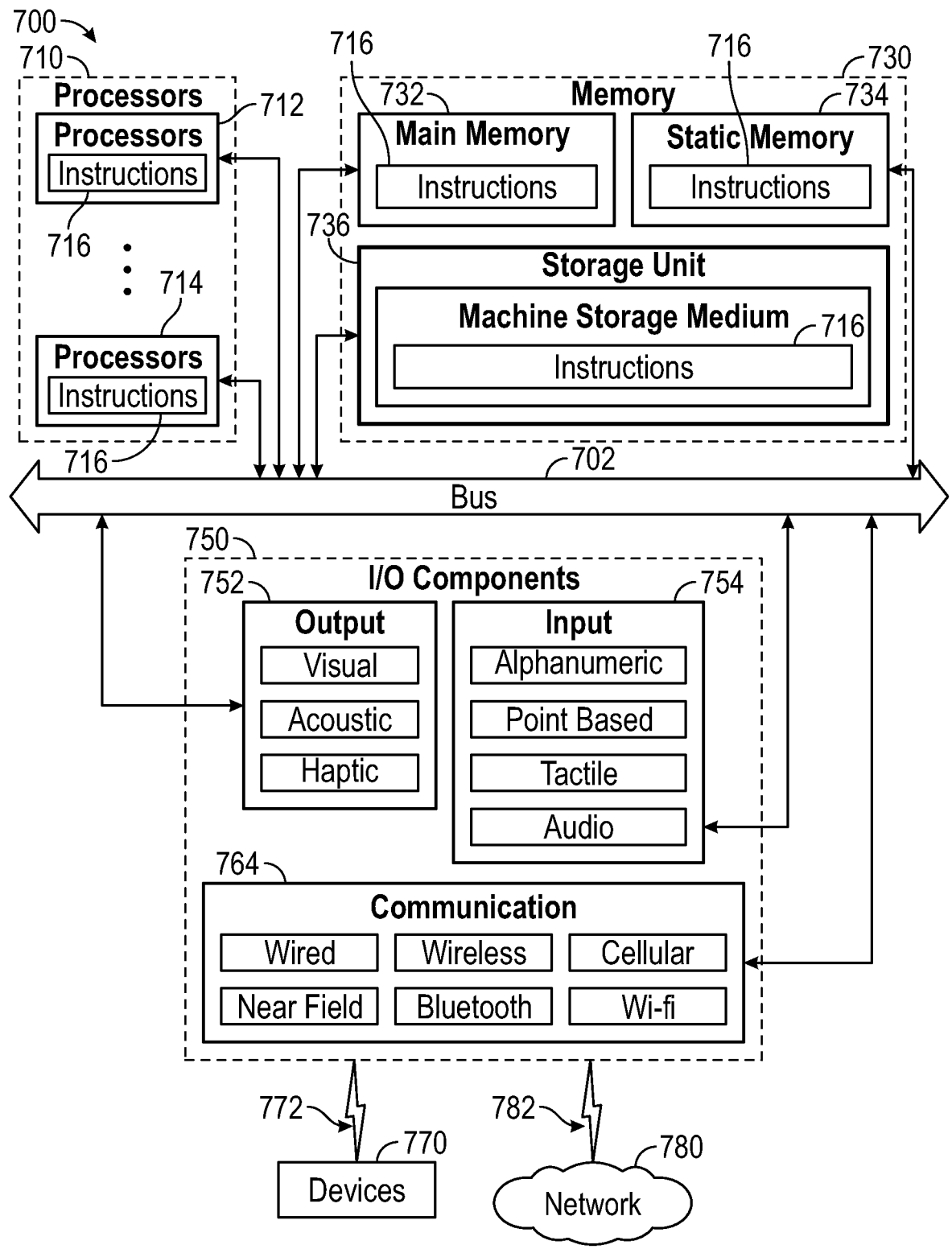
FIG. 7 illustrates a diagrammatic representation of a machine in the form of a computer system within which a set of instructions may be executed for causing the machine to perform any one or more of the methodologies or techniques discussed herein, in accordance with some embodiments of the present disclosure.

FIG. 7 illustrates a representation of a machine 700 in the form of a computer system within which a set of instructions may be executed for causing the machine 700 to perform any one or more of the methodologies and techniques discussed herein. Specifically, FIG. 7 shows a diagrammatic representation of the machine 700 in the example form of a computer system, within which instructions 716 (e.g., software, a program, an application, an applet, an app, or other executable code) for causing the machine 700 to perform any one or more of the methodologies discussed herein may be executed. For example, the instructions 716 may cause the machine 700 to execute any one or more operations of any one or more of the methods described herein. As another example, the instructions 716 may cause the machine 700 to implement portions of the data flows described herein. In this way, the instructions 716 transform a general, non-programmed machine into a particular machine 700 (e.g., service nodes, orchestrator nodes, edge managers, etc.) that is specially configured to carry out any one of the described and illustrated functions in the manner described herein.

In alternative embodiments, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 716, sequentially or otherwise, that specify actions to be taken by the machine 700. Further, while only a single machine 700 is illustrated, the term "machine" shall also be taken to include a collection of machines 700 that individually or jointly execute the instructions 716 to perform any one or more of the methodologies discussed herein.

The machine 700 includes processors 710, memory 730, and input/output (I/O) components 750 configured to communicate with each other such as via a bus 702. In an example embodiment, the processors 710 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 712 and a processor 714 that may execute the instructions 716. The term "processor" is intended to include multi-core processors 710 that may comprise two or more independent processors (sometimes referred to as "cores") that may execute instructions 716 contemporaneously. Although FIG. 7 shows multiple processors 710, the machine 700 may include a single processor with a single core, a single processor with multiple cores (e.g., a multi-core processor), multiple processors with a single core, multiple processors with multiple cores, or any combination thereof.

The memory 730 may include a main memory 732, a static memory 734, and a storage unit 736, all accessible to the processors 710 such as via the bus 702. The main memory 732, the static memory 734, and the storage unit 736 store the instructions 716 embodying any one or more of the methodologies or functions described herein. The instructions 716 may also reside, completely or partially, within the main memory 732, within the static memory 734, within the storage unit 736, within at least one of the processors 710 (e.g., within the processor's cache memory), or any suitable combination thereof, during execution thereof by the machine 700.

The I/O components 750 include components to receive input, provide output, produce output, transmit information, exchange information, capture measurements, and so on. The specific I/O components 750 that are included in a particular machine 700 will depend on the type of machine. For example, portable machines such as mobile phones will likely include a touch input device or other such input mechanisms, while a headless server machine will likely not include such a touch input device. It will be appreciated that the I/O components 750 may include many other components that are not shown in FIG. 7. The I/O components 750 are grouped according to functionality merely for simplifying the following discussion and the grouping is in no way limiting. In various example embodiments, the I/O components 750 may include output components 752 and input components 754. The output components 752 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 754 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 750 may include communication components 764 operable to couple the machine 700 to a network 780 or devices 770 via a coupling 782 and a coupling 772, respectively. For example, the communication components 764 may include a network interface component or another suitable device to interface with the network 780. In further examples, the communication components 764 may include wired communication components, wireless communication components, cellular communication components, and other communication components to provide communication via other modalities. The devices 770 may be another machine or any of a wide variety of peripheral devices (e.g., a peripheral device coupled via a universal serial bus (USB)). For example, as noted above, the machine 700 may correspond to any one of the service nodes, edge managers, orchestrator nodes, etc., described herein, and the devices 770 may include any other of these systems and devices.

The various memories (e.g., 730, 732, 734, and/or memory of the processor(s) 710 and/or the storage unit 736) may store one or more sets of instructions 716 and data structures (e.g., software) embodying or utilized by any one or more of the methodologies or functions described herein. These instructions 716, when executed by the processor(s) 710, cause various operations to implement the disclosed embodiments.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 780 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 780 or a portion of the network 780 may include a wireless or cellular network such as those defined by various standard-setting organizations, other long-range protocols, or other data transfer technology.

The instructions 716 may be transmitted or received over the network 780 using a transmission medium via a network interface device (e.g., a network interface component included in the communication components 764) and utilizing any one of a number of well-known transfer protocols (e.g., hypertext transfer protocol (HTTP)). Similarly, the instructions 716 may be transmitted or received using a transmission medium via the coupling 772 (e.g., a peer-to-peer coupling) to the devices 770. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 716 for execution by the machine 700, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the methods described herein may be performed by one or more processors. The performance of certain of the operations may be distributed among the one or more processors, not only residing within a single machine, but also deployed across a number of machines. In some example embodiments, the processor or processors may be located in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A method for dynamic network slice management, the method comprising:
   collecting, at a first service node, current load conditions including information regarding a first set of network slices currently running on the first service node, configuration of the first set of network slices, key performance indicators (KPIs) for the first set of network slices, and network functions;
   generating load condition prediction based on the collected current load conditions;
   transmitting information regarding load conditions at the first service node to a second service node;
   receiving, from the second service node, information regarding load conditions at the second service node, the received information including information regarding resource availability about a second set of network slices at the second service node;
   generating, by the first service node, a first proposal for shared slice management based on received information and load condition prediction;
   receiving, from the second service node, a second proposal for shared slice management;
   generating an agreement on shared slice management at the future time based on the first proposal and second proposal;
   modifying network slice configuration of network functions at the first service node based on the agreement.

2. The method of claim 1, wherein generating the proposal includes using a machine-learning algorithm.

3. The method of claim 1, wherein the proposal includes a provision to share servicing of a slice by the first and second service nodes.

4. The method of claim 3, wherein the first and second service nodes provide separate network components in each service nodes for servicing the slice.

5. The method of claim 3, wherein a first network component for servicing the slice is provided by only the first service node.

6. The method of claim 5, wherein the first network component is an Access & Mobility Management Function (AMF).

7. A system comprising:
   at least one hardware processor; and at least one memory storing instructions that, when executed by the at least one hardware processor, cause the at least one hardware processor to perform actions comprising:

collecting, at a first service node, current load conditions including information regarding a first set of network slices currently running on the first service node, configuration of the first set of network slices, key performance indicators (KPIs) for the first set of network slices, and network functions;

generating load condition prediction based on the collected current load conditions;

transmitting information regarding load conditions at the first service node to a second service node;

receiving, from the second service node, information regarding load conditions at the second service node, the received information including information regarding resource availability about a second set of network slices at the second service node;

generating, by the first service node, a first proposal for shared slice management based on received information and load condition prediction;

receiving, from the second service node, a second proposal for shared slice management;

generating an agreement on shared slice management at the future time based on the first proposal and second proposal;

modifying network slice configuration of network functions at the first service node based on the agreement.

8. The system of claim 7, wherein generating the proposal includes using a machine-learning algorithm.

9. The system of claim 7, wherein the proposal includes a provision to share servicing of a slice by the first and second service nodes.

10. The system of claim 9, wherein the first and second service nodes provide separate network components in each service nodes for servicing the slice.

11. The system of claim 9, wherein a first network component for servicing the slice is provided by only the first service node.

12. The system of claim 11, wherein the first network component is an Access & Mobility Management Function (AMF).

13. A machine-storage medium embodying instructions that, when executed by a machine, cause the machine to perform actions comprising:

collecting, at a first service node, current load conditions including information regarding a first set of network slices currently running on the first service node, configuration of the first set of network slices, key performance indicators (KPIs) for the first set of network slices, and network functions;

generating load condition prediction based on the collected current load conditions;

transmitting information regarding load conditions at the first service node to a second service node;

receiving, from the second service node, information regarding load conditions at the second service node, the received information including information regarding resource availability about a second set of network slices at the second service node;

generating, by the first service node, a first proposal for shared slice management based on received information and load condition prediction;

receiving, from the second service node, a second proposal for shared slice management;

generating an agreement on shared slice management at the future time based on the first proposal and second proposal;

modifying network slice configuration of network functions at the first service node based on the agreement.

14. The machine-storage medium of claim 13, wherein generating the proposal includes using a machine-learning algorithm.

15. The machine-storage medium of claim 13, wherein the proposal includes a provision to share servicing of a slice by the first and second service nodes.

16. The machine-storage medium of claim 15, wherein the first and second service nodes provide separate network components in each service nodes for servicing the slice.

17. The method of claim 15, wherein a first network component for servicing the slice is provided by only the first service node.

* * * * *